July 29, 1924.
H. C. FRENIER
EGG SEPARATOR
Filed May 14, 1924
1,502,770
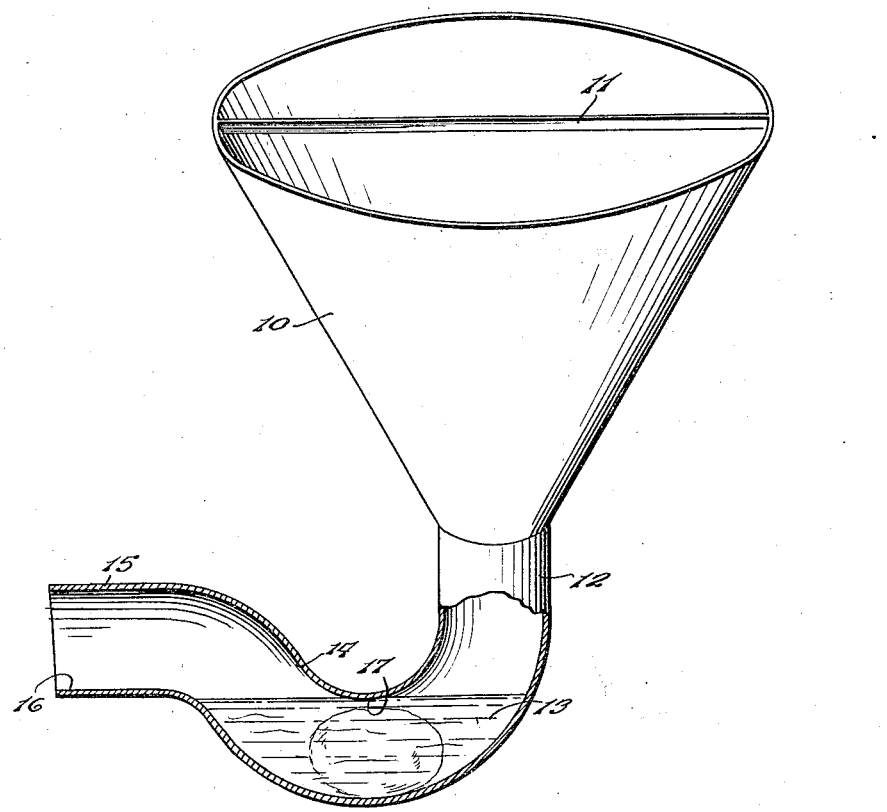
Inventor
H.C. Frenier
By Lacey & Lacey, Attorneys Patented July 29, 1924.

1,502,770

UNITED STATES PATENT OFFICE.

HENRY C. FRENIER, OF TROY, NEW YORK.

EGG SEPARATOR.

Application filed May 14, 1924. Serial No. 713,316.

*To all whom it may concern:*

Be it known that I, HENRY CHARLES FRENIER, a citizen of the United States, residing at Troy, in the county of Rensselaer and State of New York, have invented certain new and useful Improvements in Egg Separators, of which the following is a specification.

My invention relates to a device for separating bad eggs from good ones and is intended for use in bakeries where great quantities of eggs are mixed together.

Ordinarily, a baker breaks the entire number of eggs required for a cake into a bowl and if it should happen that a bad egg was amongst them this egg would spoil the whole lot, causing a loss of several dollars.

The object of the present invention is to guard against such spoiling of good eggs and for this purpose a funnel is provided into which the eggs are broken one at a time and arrangement is made so that the funnel delivers the previous egg into a bowl while the next egg is being broken and deposited in the funnel.

In the accompanying drawing, one embodiment of the invention is illustrated, and The figure is a perspective view partly in section of the device forming the subject matter of the present invention.

In the drawing, reference numeral 10 represents a funnel of the ordinary shape, that is to say, an inverted conic frustum. Across the mouth of the funnel is provided a thin blade 11 upon which the eggs are intended to be broken. At the bottom of the funnel is provided a goose neck pipe 12 which is first curved downwardly, as at 13, and then upwardly, as at 14, and terminating with a straight nozzle 15 running at right angles to the axis of the funnel. The relative position between the nozzle and the downward bend 13 of the goose neck is such that the bottom line 16 of the nozzle is approximately level with the inner curved portion 17 of the goose neck. In this manner the goose neck provides a trap in the funnel. When using the device it is set up near a bowl in which the eggs are to be mixed and beaten so that the nozzle 15 projects over the edge of the bowl. The first egg is then broken upon the blade 11 and the white and the yolk deposited in the downward bend 13 of the neck. This bend is of sufficient capacity to hold no more than one egg, that is to say, the broken egg cannot run out through the nozzle. The second egg is thereupon broken in the same manner and dropped into the neck 12 when it will push out the first egg through the nozzle into the bowl. Similarly, the third egg will push out the second one and the procedure is continued until all the eggs have passed through the funnel into the bowl except the last one which will stay in the bend 13 until the funnel is tilted when it will run out through the nozzle.

Should it now happen that after one or more eggs have been deposited in the funnel, a bad one is broken upon the blade 11, such an egg would then push out a portion of the good egg from the bottom of the bend but would itself remain therein. Directly the operator notices that he has broken a bad egg he will remove the funnel and rinse it out thoroughly before using it, again. In this manner he loses only two eggs instead of the whole batch as is ordinarily the case.

Having thus described the invention, what is claimed as new is:

1. A device of the class described comprising a funnel, a neck at the narrow end thereof, said neck having a pocket formed therein, and a nozzle formed at its free end arranged above said pocket.

2. A device of the class described comprising a funnel, a neck at the narrow end thereof, said neck having the general contour of a goose neck running first in downward and then in upward direction from said narrow end of the funnel.

3. A device of the class described comprising a funnel, a neck at the narrow end thereof, said neck having the general contour of a goose neck running first in downward and then in upward direction from said narrow end of the funnel, and a thin blade across the mouth of the funnel presenting its sharp edge upwards.

4. A device of the class described comprising a funnel, a neck at the narrow end thereof, said neck having the general contour of a goose neck running first in downward and then in upward direction from said narrow end of the funnel, a straight nozzle formed at the end of the neck having its outlet raised above said goose neck, and a thin blade across the mouth of the funnel presenting its sharp edge upwards.

5. A device of the class described comprising a receptacle, and a pocket member having open communication with the receptacle and being positioned at a lower level than the same, a discharge opening being provided in the pocket member raised above the bottom thereof.

In testimony whereof I affix my signature.

HENRY C. FRENIER. [L. S.]